US009036997B2

United States Patent
Rekaya-Ben Othman et al.

(10) Patent No.: US 9,036,997 B2
(45) Date of Patent: May 19, 2015

(54) METHOD AND SYSTEM FOR WDM TRANSMISSION WITH CHROMATO-TEMPORAL ENCODING

(75) Inventors: Ghaya Rekaya-Ben Othman, Antony (FR); Yves Jaouen, Paris (FR); Bruno Thedrez, Paris (FR); Sami Mumtaz, Bois D'arcy (FR)

(73) Assignee: Institut Mines—Telecom, Paris (FR)

( * ) Notice: Subject to any disclaimer, the term of this patent is extended or adjusted under 35 U.S.C. 154(b) by 229 days.

(21) Appl. No.: 13/878,183

(22) PCT Filed: Oct. 7, 2011

(86) PCT No.: PCT/EP2011/067577
§ 371 (c)(1),
(2), (4) Date: Jun. 21, 2013

(87) PCT Pub. No.: WO2012/045869
PCT Pub. Date: Apr. 12, 2012

(65) Prior Publication Data
US 2013/0272705 A1    Oct. 17, 2013

(30) Foreign Application Priority Data
Oct. 8, 2010  (FR) ...................................... 10 58204

(51) Int. Cl.
| H04B 10/00 | (2013.01) |
| H04J 14/06 | (2006.01) |
| H04B 10/50 | (2013.01) |
| H04B 10/516 | (2013.01) |
| H04J 14/00 | (2006.01) |

(52) U.S. Cl.
CPC .............. *H04J 14/06* (2013.01); *H04B 10/506* (2013.01); *H04B 10/516* (2013.01); *H04J 14/005* (2013.01)

(58) Field of Classification Search
USPC .................. 398/140–141, 152, 154, 183, 184
See application file for complete search history.

(56) References Cited

U.S. PATENT DOCUMENTS

| 6,025,944 | A  | * | 2/2000 | Mendez et al. | ................. 398/78 |
| 6,549,585 | B2 | * | 4/2003 | Naguib et al. | ................. 375/267 |
| 7,643,760 | B1 |   | 1/2010 | Han et al. | |

(Continued)

FOREIGN PATENT DOCUMENTS

FR            A-2930861         11/2009

OTHER PUBLICATIONS

S.M. Alamouti. "A transmit diversity technique for wireless communications." IEEE Journal. vol. 16, pp. 1451-1458, Oct. 1998.

(Continued)

*Primary Examiner* — Agustin Bello
(74) *Attorney, Agent, or Firm* — Knobbe Martens Olson & Bear LLP

(57) ABSTRACT

A transmitter and a receiver for an optical telecommunication system of the WDM type are disclosed. In one aspect, the transmitter uses a chromato-temporal encoder which, with each block of symbols to be transmitted, associates a code matrix, where each element of the matrix corresponds to a wavelength and a use of the channel. The transmitter includes multiple modulators, where each modulator modulates a laser beam at a wavelength during a use of the channel by an element corresponding to the code matrix. The beams modulated in this manner are multiplexed in an optical fiber. Another embodiment using both a wavelength and a polarization encoding is also proposed.

9 Claims, 5 Drawing Sheets

(56) References Cited

U.S. PATENT DOCUMENTS

| | | | |
|---|---|---|---|
| 7,689,124 B2* | 3/2010 | Yeon et al. | 398/78 |
| 7,983,562 B1* | 7/2011 | Yap et al. | 398/78 |
| 8,218,670 B2* | 7/2012 | Abou Rjeily | 375/267 |
| 8,514,693 B2* | 8/2013 | Balachandran et al. | 370/208 |
| 8,891,964 B2* | 11/2014 | Cvijetic et al. | 398/45 |
| 2002/0080436 A1* | 6/2002 | Hait | 359/109 |
| 2003/0123877 A1* | 7/2003 | Lo | 398/34 |
| 2004/0004755 A1 | 1/2004 | Roberts et al. | |
| 2005/0100338 A1* | 5/2005 | Yeon et al. | 398/78 |
| 2007/0122153 A1 | 5/2007 | Tamai | |
| 2007/0237209 A1* | 10/2007 | Rjeily | 375/130 |
| 2009/0196379 A1* | 8/2009 | Gan et al. | 375/340 |
| 2009/0282314 A1* | 11/2009 | Djordjevic et al. | 714/755 |
| 2009/0324224 A1 | 12/2009 | Xie | |
| 2010/0008404 A1* | 1/2010 | Abou Rjeily | 375/141 |
| 2010/0211849 A1* | 8/2010 | Djordjevic et al. | 714/755 |
| 2010/0232804 A1* | 9/2010 | Djordjevic et al. | 398/152 |
| 2012/0008961 A1* | 1/2012 | Chen et al. | 398/119 |
| 2012/0076301 A1* | 3/2012 | Kanter | 380/256 |
| 2013/0010302 A1* | 1/2013 | Sharma et al. | 356/479 |
| 2013/0076566 A1* | 3/2013 | Jiang et al. | 342/373 |
| 2013/0272705 A1* | 10/2013 | Rekaya-Ben Othman et al. | 398/65 |
| 2014/0171759 A1* | 6/2014 | White et al. | 600/306 |

OTHER PUBLICATIONS

J.C. Belfiore et al. "The golden code: a 2×2 full-rate space-time code with non-vanishing determinants." IEEE Transactions of information Theory. vol. 51, No. 4, Apr. 2005.

E. Biglieri et al. "On fast-decodable space-time block codes." IEEE Trans. on Inf, Theory, pp. 524-530, vol. 55, N 2, Feb. 2009.

J. Boutros et al. "Soft-input soft-output lattice sphere decoder for linear channels." Proc. of the IEEE Globecom 2003.

M.O. Damen et al. "Linear threaded algebraic space-time constellations." IEEE Trans. on Information Theory, vol. 49, No. 10, pp. 2372-2388, Oct. 2003.

P. Elia et al. "Perfect space-time codes for any Number of antennas." IEEE Trans. Inf. Theory, vol. 55, No. 11, Nov. 2007, pp. 3853-3868.

International Search Report for International Application No. PCT/EP2011/067577 dated Jan. 27, 2012.

Ivan Glesk et al. "Incoherent Ultrafast OCDMA Receiver Design with 2 ps All-Optical Time Gate to Suppress Multiple-Access Interference." IEEE Journal of Selected Topics in Quantum Electronics. vol. 14, No. 3. pp. 861-867. May 2008.

Iverson K et al. "Time/wavelength coding for diffuse infrared communication systems with multiple optical carriers." Proceedings of SPIE. vol. 2593. pp. 204-212. Jan. 1996.

J. Leibrich et al. "CR-RZ-DPSK for suppression of XPM on dispersion-managed long-haul optical WDM transmission on standard single-mode fiber." IEEE Photonics Technology Letters. vol. 14. No. 2. Feb. 2002. pp. 155.

L. Luzzi et al. "Augmented Lattice Reduction for MIMO decoding." IEEE Transactions on Wireless Communications. vol. 9. No. 9. Sep. 2010.

F. Oggier et al. "Perfect space-time block codes." IEEE Trans. Inf. Theory, vol. 52, No. 9, pp. 3885-3902, Sep. 2006.

G. Rekaya Ben Othman et al. "Ideal Structure of the silver code." Proc. of ISIT 2009, Seoul, Jun. 28-Jul. 3, 2009, pp. 2818-2822.

R. Ouertani et al. "The spherical bound stack decoder." IEEE International Conf. (WiMob), Avignon, France, Oct. 2008.

S. Yang et al. "Perfect space-time block codes for parallel MIMO channels." IEEE International Symposium on Information Theory (ISIT), Seattle, USA Jul. 2006.

Yen C.T. et al. "Realization of OSW/AWG-based bipolar wavelength-time optical CDMA for wired-wireless transmissions." Optical Fiber Technology. vol. 15. No. 1. pp. 74-82. Jan. 2009.

* cited by examiner

METHOD AND SYSTEM FOR WDM TRANSMISSION WITH CHROMATO-TEMPORAL ENCODING

RELATED APPLICATIONS

This application is a U.S. National Phase of International Application No. PCT/EP2011/067577, filed Oct. 7, 2011, which is incorporated by reference in its entirety.

TECHNICAL FIELD

The present invention relates generally to the field of optical telecommunications, and more specifically those using Wavelength Division Multiplexing or WDM.

DESCRIPTION OF THE RELATED TECHNOLOGY

The technique of wavelength division multiplexing (WDM) is well known in the field of optical fibre communications. It consists in multiplexing several signals of different wavelengths in a single optical fibre. This technique enables a large number of communications to be conveyed simultaneously.

FIG. 1 represents schematically a telecommunication system of the WDM type as commonly used in the state of the art.

In such a system, data flows, for example intended for different users, modulate optical signals at different wavelengths emitted by lasers 110. It will be noted that external optical modulators 120 may be absent if the modulation is undertaken directly by modulating the current source powering the laser diode.

Optical signals modulated in this manner (by phase and/or current) are wavelength multiplexed by a multiplexer 130, in an optical fibre, 140, which is generally single-mode. On reception, the different signals are wavelength demultiplexed by a demultiplexer 150, and the data of the different streams is estimated by detectors 160.

In practice, the nodes of an optical fibre network act simultaneously as transmitters and receivers: some wavelengths are inserted locally by multiplexing to transmit the local data remotely, and others are eliminated by demultiplexing to serve the local users (add-drop multiplexer).

Optical telecommunications systems of the WDM type enable high transmission rates to be attained, but conversely are subject to certain limitations.

A first limitation appears when the light power injected in the fibre is sufficiently high to generate non-linear effects in it. This will be the case in particular when it is necessary to use high-intensity optical signals to compensate for the attenuation of the fibre for a transmission over a long distance.

Indeed, a high-intensity wave transmitted at a first wavelength can modify by the Kerr effect the fibre's index at a second wavelength close to the first. More generally, when two waves are propagated in an optical fibre a phase modulation of one is observed as a function of the other's intensity, and vice versa. This phenomenon, known by the name Cross Phase Modulation or XPM, is particularly sensitive if the light intensities in question are high, and if the wavelengths are close. It firstly affects WDM systems with high spectral density, also called DWDM (Dense WDM) operating over a long transmission distance (long haul). This phenomenon is particularly marked when intensity-modulated low-transmission optical signals, modulated by OOK (On Off Keying) modulation, and phase-modulated (PSK) and/or amplitude-modulated (QAM) high-transmission optical signals, are transmitted simultaneously. The higher their spectral efficiency or, in equivalent fashion, their order of modulation, the more the signal-to-noise ratio will be degraded on reception of these phase- and/or amplitude-modulated signals.

Several solutions have been proposed in the state of the art to overcome the effects of XPM modulation, notably the use of techniques to modulate the optical signals, or alternatively techniques to compensate or pre-compensate the chromatic dispersion caused by the XPM. For a particular example of modulation, reference may be made to the article by J. Leibrich et al. entitled "CR-RZ-DPSK for suppression of XPM on dispersion-managed long-haul optical WDM transmission on standard single-mode fiber" published in IEEE Photonics Technology Letters, vol. 14, No. 2, February 2002, pp 155. For an example of chromatic dispersion compensation, reference may notably be made to patent application US-A-2009/03312212009/0324224.

These modulation or compensation techniques are, however, complex to implement. Moreover, in the first case, they generally presuppose that all the optical signals present in the fibre have been modulated with the same type of modulation. When all-or-nothing (OOK) modulated signals, and signals modulated by CR-RZ-DPSK modulation, as recommended in the above-mentioned article, are jointly propagated in the fibre, the latter are of course affected by an XPM modulation.

Another limitation of optical telecommunications systems is due to the phenomena of Polarisation Dependent Loss, or PDL, and of Polarisation Mode Dispersion, or PMD, within an optical fibre. Indeed, in an ideal fibre, two signals which are linear-polarised in two orthogonal axes are subject to the same attenuation, and are propagated at the same speed. In practice, however, asymmetry defects and random imperfections of the fibre affect two orthogonal polarisations differently, and lead to a distortion of the signal, which limits the maximum transmission rate which it is possible to attain in the fibre.

Here again, different solutions have been proposed in the state of the art, using either compensation techniques as described in application US-A-2004/0004755, or an independent modulation of each polarisation mode, as described in U.S. Pat. No. 7,643,760.

However, these solutions are complex to implement, in particular in the case of high spectral density WDM systems.

One aim of the present invention is to remedy the above-mentioned disadvantages, and in particular to propose a transmitter/a receiver for a WDM optical telecommunications system enabling the effects of XPM modulation to be avoided simply and, on a secondary basis, enabling the effects of PDL and PDM in the fibre to be avoided.

SUMMARY OF CERTAIN INVENTIVE ASPECTS

In a first embodiment the invention is defined by a transmitter for an optical telecommunications system of the WDM type using multiple wavelengths, including:

an encoder, called a chromato-temporal encoder, transforming each block of symbols to be transmitted $d_1, \ldots, d_M$ into a code matrix:

$$C = \begin{pmatrix} c_{1,1} & c_{1,2} & \cdots & c_{1,T} \\ c_{2,1} & c_{2,2} & \cdots & c_{2,T} \\ \vdots & \vdots & \ddots & \vdots \\ c_{N,1} & c_{N,2} & \cdots & c_{N,T} \end{pmatrix}$$

where each element of the matrix relates to one channel use and one wavelength of the said multiple wavelengths;

multiple modulators, associated respectively with the said wavelengths, where each modulator modulates a laser beam at a wavelength during a channel use by means of the corresponding matrix element;

a multiplexer able to multiplex the laser beams modulated in this manner in an optical fibre.

In a second embodiment the invention is defined by an encoder, called a chromato-temporal encoder, transforming each block of data to be transmitted $d_1, \ldots, d_M$ into a code matrix:

$$C = \begin{pmatrix} c_{1,1}^{//} & c_{2,1}^{//} & \cdots & c_{N,1}^{//} \\ c_{1,1}^{\perp} & c_{2,1}^{\perp} & \cdots & c_{N,1}^{\perp} \\ c_{1,2}^{//} & c_{2,2}^{//} & \cdots & c_{N,2}^{//} \\ c_{1,2}^{\perp} & c_{2,2}^{\perp} & \cdots & c_{N,2}^{\perp} \\ \vdots & \vdots & \vdots & \vdots \\ c_{1,T}^{//} & c_{2,T}^{//} & \cdots & c_{N,T}^{//} \\ c_{1,T}^{\perp} & c_{2,T}^{\perp} & \cdots & c_{N,T}^{\perp} \end{pmatrix}$$

where each element of the matrix relates to one channel use and one wavelength of the said multiple wavelengths, and to a polarisation direction;

multiple polarisers, associated respectively with the said wavelengths, where each polariser polarises a laser beam at a wavelength in two polarisation directions;

multiple modulators, where each modulator modulates a laser beam at a wavelength, polarised in a polarisation direction, during a channel use by means of the corresponding matrix element;

a multiplexer able to multiplex the laser beams polarised and modulated in this manner in an optical fibre.

The said code is advantageously linear. It may be an Alamouti's code, a silver code, a golden code, or again a perfect code.

The invention also relates to a receiver to receive a block of symbols transmitted by the transmitter according to the first embodiment, where the said receiver includes a demultiplexer able to demultiplex multiple beams having different wavelengths, characterised in that it also includes:

multiple demodulators, where each demodulator demodulates one of the said beams, and supplies a decision variable on each use of the channel;

a lattice decoder able to receive the said decision variables during multiple channel uses, and to deduce from them an estimate of the symbols of the said block.

The invention also relates to a receiver to receive a block of symbols transmitted by the transmitter according to the second embodiment, where the said receiver includes a demultiplexer able to demultiplex the signal received into multiple beams having different wavelengths, also including:

multiple polarisers, where each polariser polarises one of the said beams in a first and a second polarisation direction;

multiple demodulators, where each demodulator demodulates one of the said polarised beams, and supplies a decision variable during a use of the channel;

a lattice decoder able to receive the said decision variables during multiple channel uses, and to deduce from them an estimate of the symbols of the said block.

The lattice decoder is advantageously a sphere decoder or a decoder of the SB-stack type, or again a lattice decoder implementing an LLL reduction of the network.

BRIEF DESCRIPTION OF THE DRAWINGS

Other characteristics and advantages of the invention will appear on reading the preferential embodiments of the invention in reference to the attached figures, among which.

DETAILED DESCRIPTION OF CERTAIN ILLUSTRATIVE EMBODIMENTS

The idea at the root of the invention is to use a technique similar to that of space-time encoding in MIMO (Multiple In Multiple Out) systems, not only to avoid cross phase modulation (XPM), but also to make use of the diversity caused by the latter.

Figure 1:
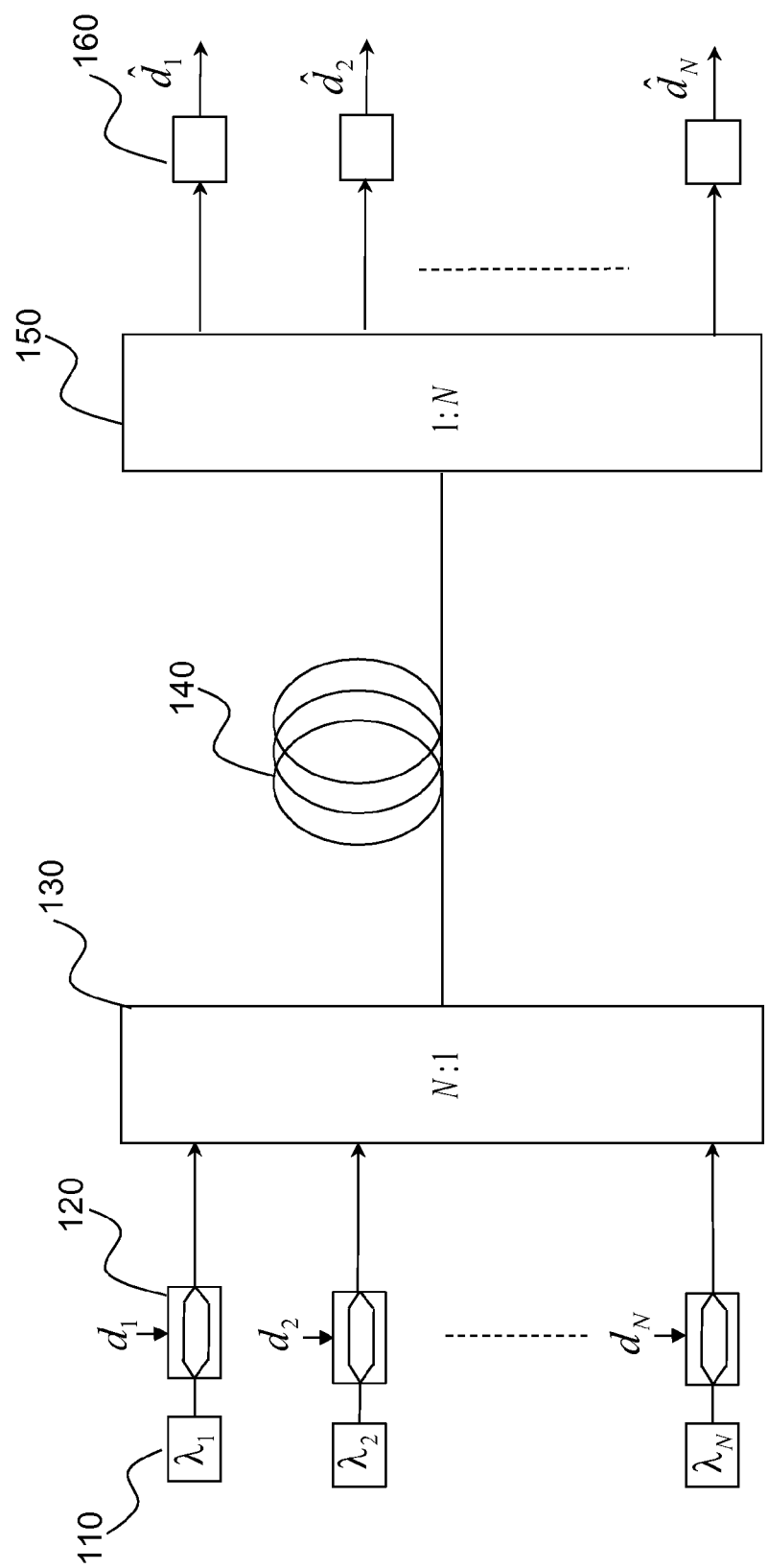
FIG. 1 represents schematically a telecommunication system of the WDM type, known in the state of the art.
Figure 2A:
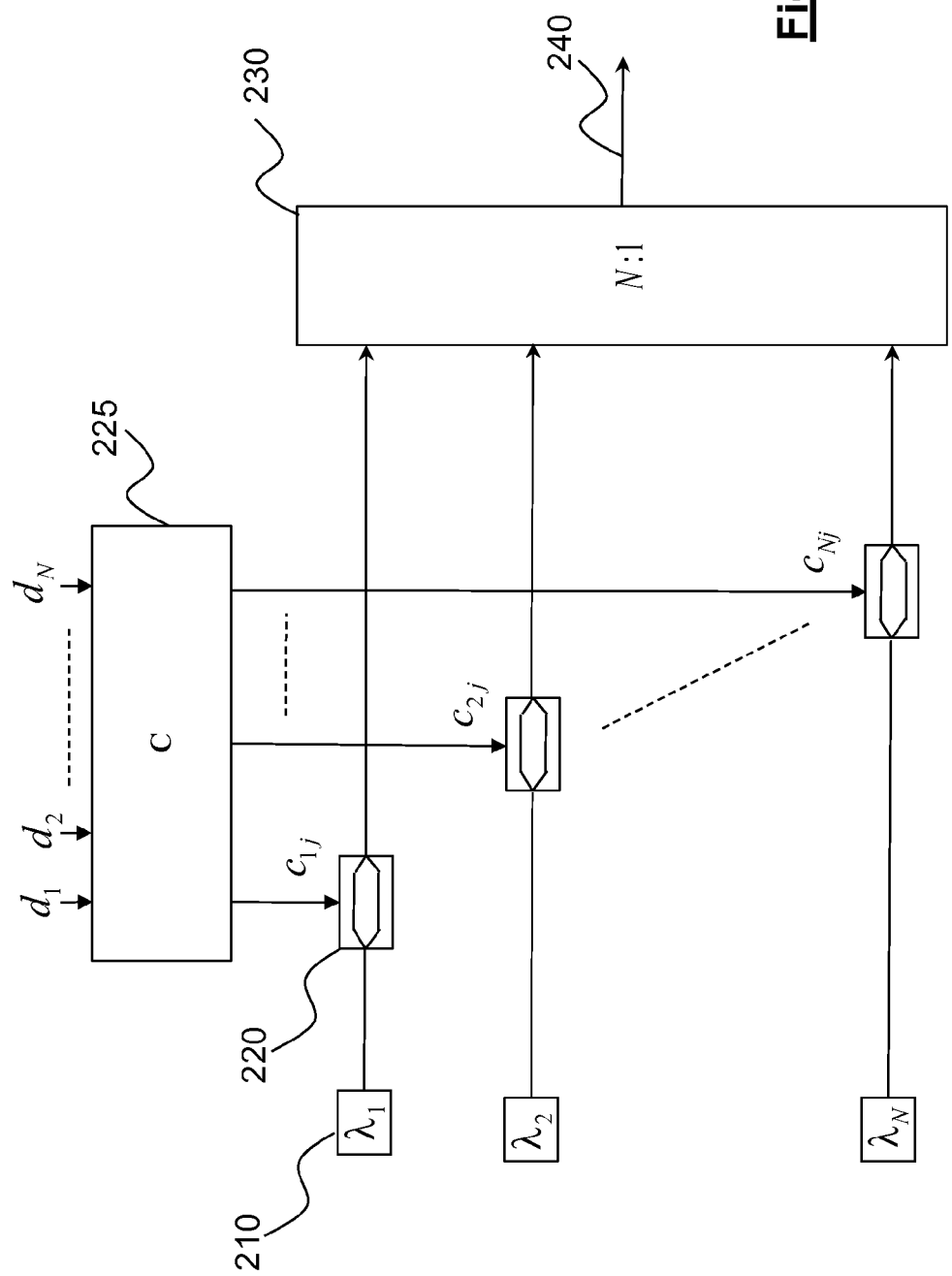
FIG. 2A represents a transmitter for a telecommunication system of the WDM type, according to a first embodiment of the invention.

More specifically, FIG. 2A represents schematically a transmitter for a WDM optical telecommunication system, according to a first embodiment of the invention. Those skilled in the art will understand that this transmitter can in particular be used in a node of the add-and-drop type of an optical fibre network.

We shall presuppose that the transmitter must transmit M multiple data streams, and that for a TTI (Time Transmission Interval) we shall note the symbols to be transmitted $d_1$ to $d_M$. These symbols are encoded by a chromato-temporal encoder 225 which associates a matrix C of size N×T, called in what follows a chromato-temporal matrix, with each block or vector of symbols $(d_1, \ldots, d_M)$:

$$C = \begin{pmatrix} c_{1,1} & c_{1,2} & \cdots & c_{1,T} \\ c_{2,1} & c_{2,2} & \cdots & c_{2,T} \\ \vdots & \vdots & \ddots & \vdots \\ c_{N,1} & c_{N,2} & \cdots & c_{N,T} \end{pmatrix} \quad (1)$$

where coefficients $C_{n,t}$, $n=1, \ldots, N$, $t=1, \ldots, T$ (with $N \geq 2$ and $T \geq 2$) of the code are, as a general rule, complex coefficients depending on the information symbols, N is the number of wavelengths used by the transmitter, T is an integer indicating the code's time extent, i.e. the PCUs (Per Channel Uses).

When a channel t is used coefficient $c_{n,t}$ modulates the optical signal emitted by laser 210 at wavelength $\lambda_n$. The modulation implemented in modulator 220 may be a phase and/or amplitude modulation. The modulation types and modulation orders used for the different wavelengths are not necessarily identical. The optical signals modulated in this manner are then multiplexed by multiplexer 230 and subsequently transmitted in optical fibre 240. It will thus be understood that while channel t is in use, the t-th vector-column of matrix C is transmitted in the optical fibre, and that after the T channel uses all the coefficients of the matrix will have been transmitted.

Following the example of a space-time code, the chromato-temporal code is characterised by its transmission rate, i.e. by the number of information symbols which it transmits per channel use (PCU). The code is said to be a "full-rate" code if it is N times higher than the transmission rate for a single wavelength.

The chromato-temporal encoding may be linear, in other words the code's matrix C may be written as follows:

$$vec(C) = Gd \quad (2)$$

where vec(C) is the column vector obtained by concatenating the column vectors of matrix C, $d = (d_1, \ldots, d_M)^T$ and G is a matrix of size NT×M, called a "code-generating" matrix.

According to a first example of linear chromato-temporal encoding for a transmitter with two wavelengths, $\lambda_1$ and $\lambda_2$, it may be possible to use the space-time encoding matrix proposed by S. M. Alamouti in his article entitled "A transmit diversity technique for wireless communications", published in IEEE Journal on selected areas in communications, vol. 16, pp. 1451-1458, October 1998. The Alamouti's code is defined by the matrix of size 2×2:

$$C = \begin{pmatrix} d_1 & -d_2^* \\ d_2 & d_1^* \end{pmatrix} \quad (3)$$

where $d_1$ and $d_2$ are two information symbols to be transmitted and $d^*_1$ and $d^*_2$ their respective conjugates.

According to a second example embodiment of linear chromato-temporal encoding, use will advantageously be made of the golden code as defined in the article by J. C. Belfiore et al. entitled "The golden code: a 2×2 full-rate space-time code with non-vanishing determinants", the matrix of which is given by:

$$C = \begin{pmatrix} \alpha(d_1 + d_2\theta) & \alpha(d_3 + d_4\theta) \\ i\bar{\alpha}(d_3 + d_4\bar{\theta}) & \bar{\alpha}(d_1 + d_2\bar{\theta}) \end{pmatrix} \quad (4)$$

where $$\theta = \frac{1+\sqrt{5}}{2}, \bar{\theta} = \frac{1-\sqrt{5}}{2},$$

$i=\sqrt{-1}$, $\alpha=1+i(1-\theta)$, $\bar{\alpha}=1+i(1-\bar{\theta})$, where the information symbols to be transmitted $d_1$ to $d_4$ are symbols with a QAM constellation which may be written in the form $\lambda+i\mu$, where $\lambda$ and $\mu$ are relative integers.

The golden code has the advantage that it is full-rate and maximum-diversity.

According to a third example embodiment of linear chromato-temporal encoding, use will advantageously be made of the silver code as described, for example, in the article by E. Biglieri et al. entitled "On fast-decodable space-time block codes" published in IEEE Trans. on Inf. Theory, pages 524-530, vol. 55, N° 2, February 2009, or again in the article by G. Rekaya Ben Othman et al. entitled "Ideal Structure of the silver code", Proc. of ISIT 2009, Seoul, Jun. 28-Jul. 3, 2009, pp. 2818-2822.

The matrix of the silver code is given by:

$$C = \begin{pmatrix} d_1 & -d_2^* \\ d_2 & d_1^* \end{pmatrix} + \begin{pmatrix} 1 & 0 \\ 0 & -1 \end{pmatrix}\begin{pmatrix} z_1 & -z_2^* \\ z_2 & z_1^* \end{pmatrix} \quad (5)$$

with $$\begin{pmatrix} z_1 \\ z_2 \end{pmatrix} = U\begin{pmatrix} d_3 \\ d_4 \end{pmatrix},$$

where U is the unitary matrix defined by:

$$U = \frac{1}{\sqrt{7}}\begin{pmatrix} 1+i & -1+2i \\ 1+2i & 1-i \end{pmatrix} \quad (6)$$

The silver code also has the advantage that it is full-rate and maximum-diversity.

According to a fourth example embodiment of chromato-temporal encoding, any number N of wavelengths a perfect code of matrix N×N may be used, as defined in the article by F. Oggier et al. entitled "Perfect space-time block codes" published in IEEE Trans. Inf. Theory, vol. 52, no. 9, pp. 3885-3902, September 2006. It is recalled that the properties of a perfect code are that it is full-rate, that it has a determinant which does not tend towards zero when the size of the modulation constellation tends towards infinity, or in other words a gain higher than a non-zero limit independent of the modulation constellation, it has an energy for each encoded symbol (i.e. for each element of the matrix) of the same order as those of the symbols of the constellation, and an identical average energy for each encoded symbol (where the average is taken over the N consecutive transmission intervals). Examples of perfect codes will be found for any number N of wavelengths (instead of antennas) in the article by P. Elia et al. entitled "Perfect space-time codes for any number of antennas" published in IEEE Trans. Inf. Theory, vol. 55, no 11, November 2007, pp. 3853-3868.

According to a fifth embodiment of chromato-temporal encoding, an encoding matrix of the TAST type (Threaded Algebraic Space Time) may be used, as described in the article by M. O. Damen et al. entitled "Linear threaded algebraic space-time constellations" published in IEEE Trans. on Information Theory, Vol. 49, No. 10, pp. 2372-2388, October 2003, except that the spatial degree of freedom (the different antennae of the ST system) is replaced by a chromatic degree of freedom (the different wavelengths of the chromato-temporal system).

In any event, those skilled in the art will understand that, whichever chromato-temporal encoding matrix is used the disturbances caused by the XPM modulation at the different wavelengths are no longer opposed as in the systems of the prior art but, on the contrary, use is made of the dependency relationships between the different wavelengths, introduced by the encoding, to reduce the sensitivity of these disturbances.

Figure 2B:
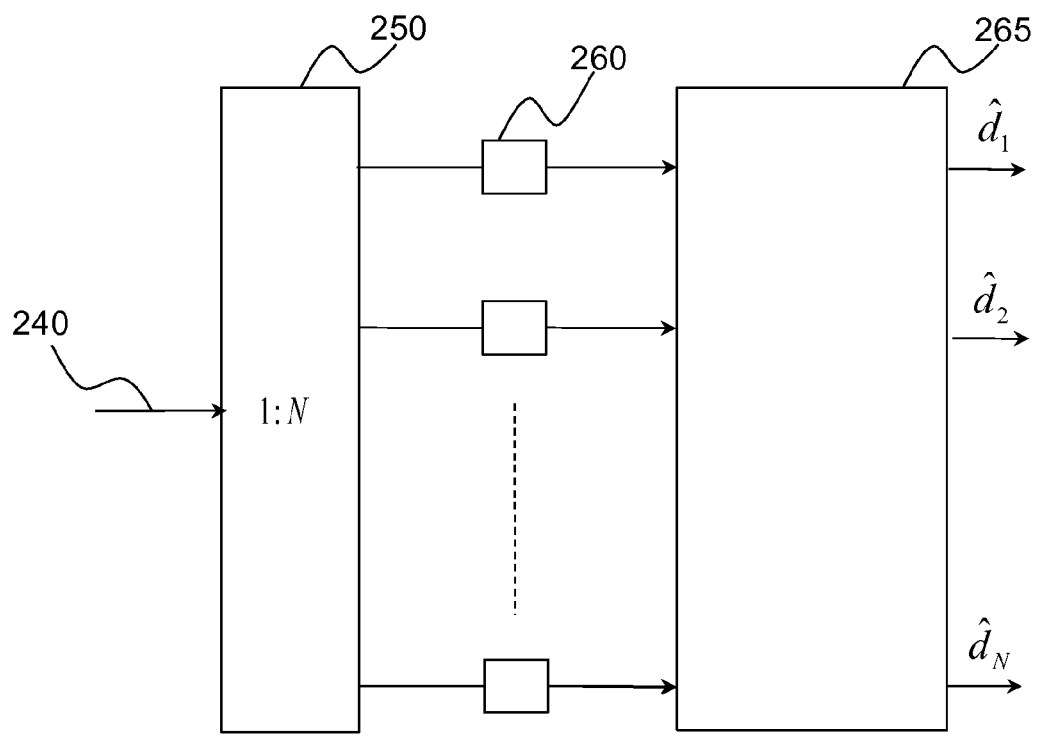
FIG. 2B represents a receiver for a telecommunication system of the WDM type, according to a first embodiment of the invention.

FIG. 2B represents schematically a receiver for a WDM telecommunication system, according to a first embodiment of the invention. This receiver can be used in particular in a node of the add-and-drop type of an optical fibre network.

The receiver includes a wavelength demultiplexer 250 separating wavelengths $\lambda_1$ to $\lambda_N$, where demodulators 260 supply decision variables $y_{n,t}$ and a chromato-temporal decoder 265 deduces from them the hard values of information symbols $\hat{d}_1, \ldots, \hat{d}_N$. The demodulation operation at 260 is, naturally, the reverse of modulation operation 220 for the corresponding wavelength. More specifically, the chromato-temporal decoder uses decision variables $y_{n,t}$ n=1, ..., N, t=1, ..., T relative to a given transmission interval, and performs a lattice decoding operation, in a known manner, in order to deduce symbols $\hat{d}_1, \ldots, \hat{d}_M$ from the points in the lattice. The lattice decoder may advantageously be a sphere decoder, a lattice decoder assisted by LLL (Lenstra, Lenstra, Lovasz) lattice reduction, or again an augmented LLL-reduced lattice, as described in the article by L. Luzzi et al. entitled "Augmented Lattice Reduction for MIMO decoding".

The signal received during a transmission interval, or in other words during N successive uses of the channel, may be represented in matrix form:

$$Y = HC + N \quad (7)$$

where Y is the matrix of size N×T, the elements of which are values $y_{n,t}$ n=1, ..., N, t=1, ..., T, C is the chromato-temporal encoding matrix used at reception, H is a matrix with complex coefficients of size N×N representative of the transmission channel, and N is a noise matrix of size N×T.

If it is supposed, without loss of generality, that the chromato-temporal encoding is linear, expression (7) becomes, in vector form:

$$vect(Y) = Fd + vec(N) \quad (8)$$

where F is a matrix of size NT×M obtained from the matrix which generated code G and from matrix H. The coefficients of H can be estimated by the receiver by means of pilot symbols, in a known manner.

Expression (8) shows that although symbols $d_1, \ldots, d_M$ belong to a QAM modulation constellation, vector vect(Y) does indeed belong to a lattice if there is no noise. Estimated symbols $\hat{d}_1, \ldots, \hat{d}_M$ are obtained, by virtue of decoder 265, from the lattice point closest to vect (Y) belonging to the product constellation.

According to one variant, the chromato-temporal decoder may be a soft-output decoder using, for example, a soft-output sphere decoder of the type described in the article by J. Boutros et al. entitled "Soft-input soft-output lattice sphere decoder for linear channels", Proc. of the IEEE Globecom '03, also called an LSD (List Sphere Decoder). Such a decoder uses a list algorithm, and determines in an iterative manner, for example in the form of LLRs (Logarithms of Likelihood Ratio), the posterior probabilities of the information symbols, bearing in mind the points of the lattice included in a sphere centred on a point representing the received signal or, preferably, on a point of the lattice corresponding to a first estimate in the sense of maximum likelihood (ML estimate), i.e. to the point of the constellation closest to the received signal.

According to another variant, the chromato-temporal decoder may advantageously use a Spherical-Bound Stack Decoder, of the type described in the article by R. Ouertani et al. entitled "The spherical bound stack decoder" published in IEEE International Conf. on wireless and mobile computing, networking and communications, (WiMob), Avignon, France, October 2008, also described in patent application FR-A-2930861 incorporated by reference. This variant exists in the form of a version with hard outputs, or a version with soft outputs.

Figure 3A:
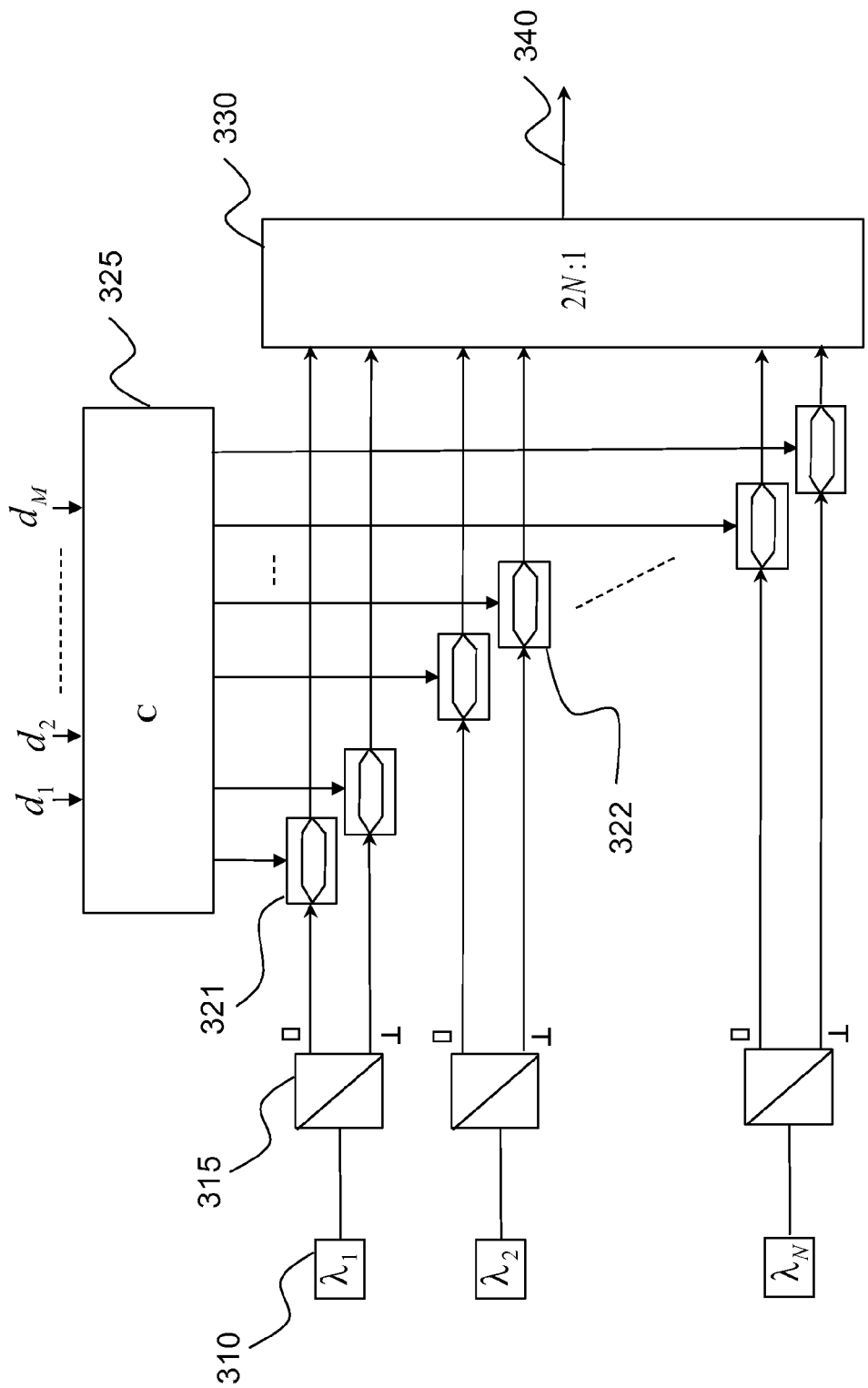
FIG. 3A represents a transmitter for a telecommunication system of the WDM type, according to a second embodiment of the invention.

FIG. 3A represents schematically a transmitter for a WDM telecommunication system, according to a second embodiment of the invention.

Unlike the first embodiment, this transmitter uses both the diversity introduced by the XPM modulation, and the diversity introduced by the on the polarisation dependent loss, PDL. It enables compensation to be made in the receiver both for the effects of the XPM modulation, and for those of the polarisation dependent loss PDL.

More specifically, the transmitter includes N multiple laser sources 310 transmitting at multiple wavelengths $\lambda_1, \ldots, \lambda_N$, an equal number of multiple polarisers 315, each supplying two orthogonal polarisations, 2N multiple modulators, where a modulator pair 321, 322 is included for each wavelength, a chromato-temporal encoder 325 and a polarisation and wavelength multiplexer, 350. Chromato-temporal encoder 325 encodes a block of symbols ($d_1, \ldots, d_M$) into a code matrix C of size 2N×T:

$$C = \begin{pmatrix} c_{1,1}^{\parallel} & c_{2,1}^{\parallel} & \cdots & c_{N,1}^{\parallel} \\ c_{1,1}^{\perp} & c_{2,1}^{\perp} & \cdots & c_{N,1}^{\perp} \\ c_{1,2}^{\parallel} & c_{2,2}^{\parallel} & \cdots & c_{N,2}^{\parallel} \\ c_{1,2}^{\perp} & c_{2,2}^{\perp} & \cdots & c_{N,2}^{\perp} \\ \vdots & \vdots & \vdots & \vdots \\ c_{1,T}^{\parallel} & c_{2,T}^{\parallel} & \cdots & c_{N,T}^{\parallel} \\ c_{1,T}^{\perp} & c_{2,T}^{\perp} & \cdots & c_{N,T}^{\perp} \end{pmatrix} \quad (9)$$

where coefficients $c_{n,t}^{\parallel}$ and $c_{n,t}^{\perp}$ are, as a general rule, complex coefficients depending on information symbols $d_1, \ldots, d_M$, where the first is used to modulate a first polarisation direction of the beam at wavelength $\lambda_n$, and the second is used to modulate a second polarisation direction orthogonal to the first. More specifically, for each wavelength a first modulator 321 will modulate the first polarisation direction using coefficient $c_{n,t}^{\parallel}$, and a second modulator 322 will modulate the second polarisation direction. T=2N will preferably be chosen.

By using two orthogonal polarisations a transmission rate can be attained which is twice as high as in the first embodiment.

In particular, a perfect code of matrix 2N×2N, as mentioned above, may be used as the code. For example, in the case of two wavelengths and two polarisations, a perfect code of size 4×4 will be used.

Alternatively, a perfect code may be used of the type described in the article by S. Yang et al. entitled "Perfect space-time block codes for parallel MIMO channels" published in IEEE International Symposium on Information Theory (ISIT), Seattle, USA July 2006, except that the spatial degree of freedom is replaced, again, by the chromatic degree of freedom.

The 2N polarised and modulated beams are then generally multiplexed by multiplexer 350 in optical fibre 340.

Figure 3B:
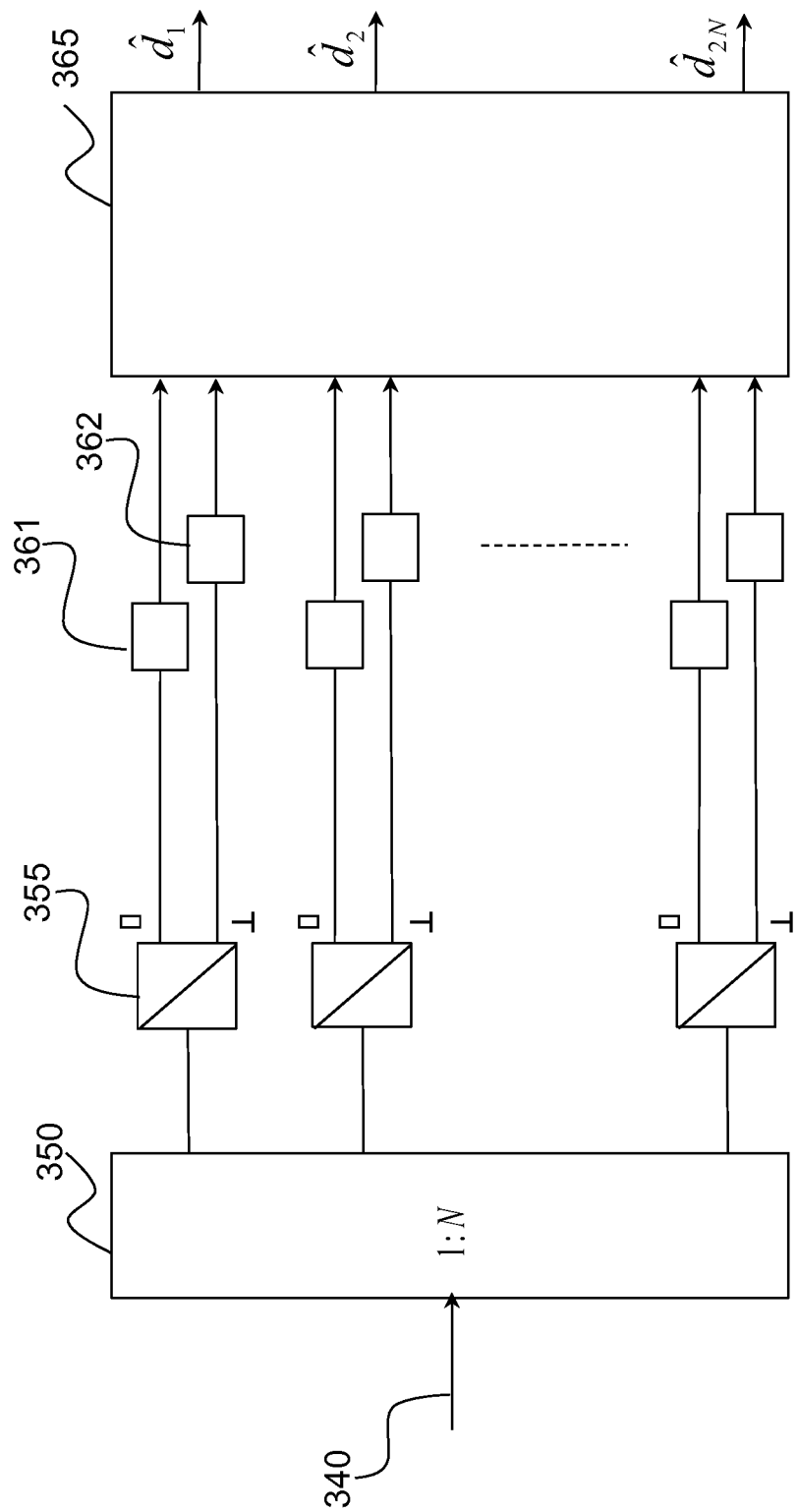
FIG. 3B represents a receiver for a telecommunication system of the WDM type, according to a second embodiment of the invention.

FIG. 3B represents schematically a receiver for a WDM telecommunication system, according to a second embodiment of the invention.

The receiver includes a wavelength demultiplexer 350 separating wavelengths $\lambda_1$ to $\lambda_N$, N multiple polarisers, supplying for each wavelength a first beam polarised according to the said first polarisation direction, and a second beam polarised according to the said second polarisation direction. Modulators 361 and 362 of modulate respectively the first and second beams at each wavelength $\lambda_n$, generating decision variables $y_{n,t}^{\parallel}$ and $y_{n,t}^{\perp}$. These 2N decision variables are supplied to a chromato-temporal decoder 365.

Chromato-temporal decoder 365 uses the 2N decision variables $y_{n,t}^H, y_{n,t}^\perp$ $n=1, \ldots, N, t=1, \ldots, T$ relative to an identical transmission interval, and deduces from them a hard estimate of received symbols $\hat{d}_1, \ldots, \hat{d}_M$.

As in the first embodiment, decoder 365 implements a lattice decoding with the same variants as those set out above. In particular, use of a soft-output sphere decoder may be envisaged to produce chromato-temporal decoder 365.

Those skilled in the art will understand that other embodiments may be envisaged without however going beyond the scope of the invention. For example, the transmitter may perform a chromato-temporal encoding according to the first embodiment for a first subset of N' wavelengths and a chromato-temporal encoding according to the second embodiment for a second set of N" wavelengths. The 2N' polarised beams and the N" non-polarised beams are then multiplexed in the optical fibre. At reception, N" polarisers and 2N"+N' demodulators are used, supplying together 2N"+N' decision variables. The decoder performs a lattice decoding of these 2N"+N' variables and then deduces estimated symbols $\hat{d}_1, \ldots, \hat{d}_M$ from them.

The chromato-temporal decoding variants described for the first embodiment also apply, mutatis mutandis, in the second embodiment.

What is claimed is:

1. A transmitter for an optical telecommunication system of a WDM type, using multiple wavelengths, the transmitter comprising:
    a chromato-temporal encoder, transforming each block of data to be transmitted $d_1, \ldots, d_M$ into a code matrix:

$$C = \begin{pmatrix} c_{1,1}^{H} & c_{2,1}^{H} & \ldots & c_{N,1}^{H} \\ c_{1,1}^{\perp} & c_{2,1}^{\perp} & \ldots & c_{N,1}^{\perp} \\ c_{1,2}^{H} & c_{2,2}^{H} & \ldots & c_{N,2}^{H} \\ c_{1,2}^{\perp} & c_{2,2}^{\perp} & \ldots & c_{N,2}^{\perp} \\ \vdots & \vdots & \vdots & \vdots \\ c_{1,T}^{H} & c_{2,T}^{H} & \ldots & c_{N,T}^{H} \\ c_{1,T}^{\perp} & c_{2,T}^{\perp} & \ldots & c_{N,T}^{\perp} \end{pmatrix}$$

where each element of the matrix relates to one channel use and one wavelength of the multiple wavelengths, and to a polarization direction;
    multiple polarizers associated respectively with the wavelengths, where each polarizer polarizes a laser beam at a wavelength in two polarization directions;
    multiple modulators, where each modulator modulates a laser beam at a wavelength, polarized in a polarization direction, during a channel use by the corresponding matrix element, where the two polarization directions of each wavelength are modulated by the modulators; and
    a multiplexer configured to multiplex the laser beams polarized and modulated in an optical fiber.

2. A transmitter according to claim 1, wherein the code is linear.

3. A transmitter according to claim 2, wherein the code is an Alamouti's code.

4. A transmitter according to claim 2, wherein the code is a silver code or a golden code.

5. A transmitter according to claim 2, wherein the code is a perfect code.

6. A receiver for receiving a signal comprising a block of symbols transmitted by a transmitter, the receiver comprising:
    a demultiplexer configured to demultiplex the received signal into multiple beams having different wavelengths;
    multiple polarizers, where each polarizer polarizes one of the beams in a first and a second polarization direction;
    multiple demodulators, where each demodulator demodulates one of the polarized beams, and supplies a decision variable during use of a channel; and
    a lattice decoder configured to receive the decision variables during multiple channel uses, and to deduce from the decision variables an estimate of the symbols of the block.

7. A receiver according to claim 6, wherein the lattice decoder is a sphere decoder.

8. A receiver according to claim 6, wherein the lattice decoder is a decoder of the SB-stack type.

9. A receiver according to claim 6, wherein the lattice decoder implements an LLL reduction of the network.

* * * * *

UNITED STATES PATENT AND TRADEMARK OFFICE
CERTIFICATE OF CORRECTION

PATENT NO. : 9,036,997 B2
APPLICATION NO. : 13/878183
DATED : May 19, 2015
INVENTOR(S) : Ghaya Rekaya-Ben Othman Page 1 of 1

It is certified that error appears in the above-identified patent and that said Letters Patent is hereby corrected as shown below:

Specification

In column 2 at line 18, Change "US-A-2009/03312212009/0324224." to --US-A-2009/0324224.--.

In column 8 at line 29, Change "$c_{n,t}^{H}$" to -- $c_{n,t}^{H}$ --.

In column 8 at line 36, Change "$c_{n,t}^{H}$," to -- $c_{n,t}^{H}$, --.

In column 8 at line 66, Change "$y_{n,t}^{H}$" to -- $y_{n,t}^{H}$ --.

In column 9 at line 2, Change "$y_{n,t}^{H}$," to -- $y_{n,t}^{H}$, --.

Claims

In column 9 at line 29, In Claim 1, change "encoder," to --encoder--.

Signed and Sealed this
Sixteenth Day of February, 2016

Michelle K. Lee
*Director of the United States Patent and Trademark Office*